UNITED STATES PATENT OFFICE.

JOHN FLINT, OF EMU PLAINS, NEAR PENRITH, NEW SOUTH WALES, AUSTRALIA.

RUBBER SUBSTITUTE.

1,233,459.      Specification of Letters Patent.      Patented July 17, 1917.

No Drawing.      Application filed March 27, 1917. Serial No. 157,678.

*To all whom it may concern:*

Be it known that I, JOHN FLINT, a subject of the King of Denmark, residing at Emu Plains, near Penrith, in the State of New South Wales, Commonwealth of Australia, have invented certain new and useful Improvements in Rubber Substitutes, of which the following is a specification.

This invention relates to a new and improved compound which will be particularly useful for numerous commercial purposes though devised primarily to provide a substance which can be employed with equal efficiency to and in place of rubber in those uses in which the latter is now generally employed, and at a considerable reduction of cost.

The compound is capable of being so made that its properties of elasticity, resistance to pressure and mechanical strength vary to meet particular uses for which it is to be commercially employed, and variations as to proportions of the elements of the compound and otherwise for the purpose indicated may be made within the scope of the invention.

The improved compound which possesses characteristics of rubber can be molded, pressed and worked into required shapes and dimensions.

In the production of the improved compound to have the properties of pliability and resiliency as requisite for its more general applications I employ the following and in the proportions as hereunder set out:

| | |
|---|---|
| Gelatin (or glue) | 24 % |
| Glycerin (or glucose or treacle) | 28 % |
| Water | 10 % |
| Rubber | 8 % |
| Diatomaceous earth or commercial whiting | 8 % |
| Zinc white | 8 % |
| Sulfur | 5 % |
| Calcined magnesia | 3½% |
| Litharge | 2½% |
| Potassium bichromate (or formaldehyde, or tannin, or like toughening agent) | 2 % |
| Coloring matter | 1 % |
| | 100 % |

In carrying the invention into effect the gelatin (or glue), glycerin and water are heated in a suitable vessel to reduce the glycerin (or glue) and to insure a thorough admixture. The remaining ingredients having been prepared and mixed are then added to the mixture when still warm and in a semi-liquid condition and thoroughly agitated, when the resultant mixture is milled and placed into molds. The milling preferably consists of passing the mixture through rollers, the size and weight of which vary according to the quantity of material being treated. After being molded the mixture is vulcanized, it having been found that a mixture compounded according to the recipe above set out will vulcanize in from 25 to 30 minutes under 50 lbs. steam pressure.

For those uses in which it is necessary that the resistance to pressure possessed by the compound should be increased and that the compound should be of a hardened nature this result may be obtained either by increasing the proportions of the powder ingredients, or by the addition of calamin, pontianak or asphaltum or the like materials employed for the purpose.

Should it be necessary that the elasticity or resilience of the compound be increased the quantities of glycerin and gelatin (or the known equivalents of these substances and which may be employed in substitution therefor) are increased, or coal tar, pitch or a like softening agent can be used in conjunction with either or both of said substances or be employed as substitutes therefor.

The compound can be made to have any required degree of flexibility and resilience which permits of its application to commercial uses having a wide range. The compound may be employed as an inner core for pneumatic tires, to provide a very resilient non-puncturable tire, or may be used for insulations in electrical work, for tilings and roofings and a variety of other purposes.

What I do claim is:—

1. A vulcanizable composition composed of gelatin, glycerin, water, rubber, diatomaceous earth, zinc white, sulfur, calcined magnesia, litharge, and a toughening agent, substantially in the proportions described, 2. A vulcanizable composition of the kind described and composed of gelatin 24%, glycerin 28%, water 10%, rubber 8%, diatomaceous earth 8%, zinc white 8%, sulfur 5%, calcined magnesia 3½%, litharge 2½%, formaldehyde 2%, and coloring matter 1%.

In witness whereof I have signed this specification in presence of two witnesses.

JOHN FLINT.

Witnesses:
H. C. CAMPBELL,
A. J. CALLINAN.